United States Patent
Lee

(10) Patent No.: US 8,077,485 B2
(45) Date of Patent: Dec. 13, 2011

(54) CIRCUIT FOR TRANSMITTING AN AMPLIFIED RESONANT POWER TO LOAD

(76) Inventor: Kwang-Jeek Lee, Seoul (KR)

( * ) Notice: Subject to any disclaimer, the term of this patent is extended or adjusted under 35 U.S.C. 154(b) by 500 days.

(21) Appl. No.: 12/158,665

(22) PCT Filed: Dec. 28, 2006

(86) PCT No.: PCT/KR2006/005801
§ 371 (c)(1),
(2), (4) Date: Jun. 20, 2008

(87) PCT Pub. No.: WO2007/075058
PCT Pub. Date: Jul. 5, 2007

(65) Prior Publication Data
US 2008/0297134 A1    Dec. 4, 2008

(30) Foreign Application Priority Data
Dec. 29, 2005    (KR) .................. 10-2005-0133362

(51) Int. Cl.
*H02M 3/335*    (2006.01)
(52) U.S. Cl. .................................. 363/21.02
(58) Field of Classification Search .............. 363/15, 363/16, 20, 21.02
See application file for complete search history.

(56) References Cited

U.S. PATENT DOCUMENTS

| 3,828,239 | A |   | 8/1974  | Nagai et al. |
|-----------|---|---|---------|---------------|
| 5,646,835 | A |   | 7/1997  | Katcha |
| 6,016,259 | A | * | 1/2000  | Tamura et al. ............. 363/21.02 |
| 6,040,986 | A | * | 3/2000  | Sakamoto et al. ......... 363/21.02 |
| 6,147,881 | A |   | 11/2000 | Lau |
| 7,212,415 | B2| * | 5/2007  | Osaka ........................ 363/21.02 |

FOREIGN PATENT DOCUMENTS

| JP | 03055811 A | 3/1991 |
| JP | 11136945 A | 5/1999 |
| JP | 13-2184456 | 8/2001 |
| JP | 2005160215 A | 6/2005 |

OTHER PUBLICATIONS

Physik, W. Westpahl, Springer-Verlag, 1970, pp. 38-41.

* cited by examiner

*Primary Examiner* — Matthew Nguyen
(74) *Attorney, Agent, or Firm* — Park & Associates IP Law, P.C.

(57) ABSTRACT

A circuit for transferring amplified resonant power to a load is disclosed. The circuit transfers amplified resonant power, which is generated in an inductor of a conventional transformer when serial or parallel resonance of a conventional power supply is formed, to a load through the conventional transformer. The circuit comprises: a power supply for producing and supplying voltage or current; a power amplifier for generating amplified resonant power using the voltage or current; and a power transferring unit for transferring the amplified resonant power to the load using a transformer.

13 Claims, 4 Drawing Sheets

[Fig. 1]
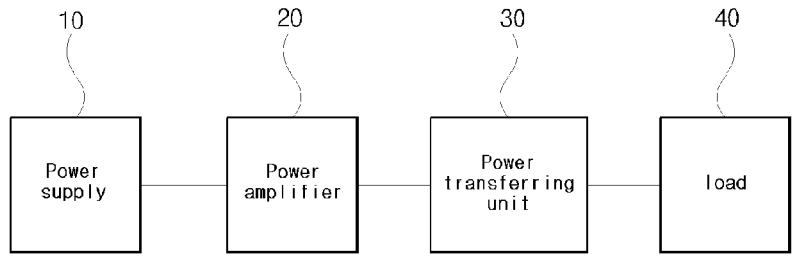
[Fig. 2]
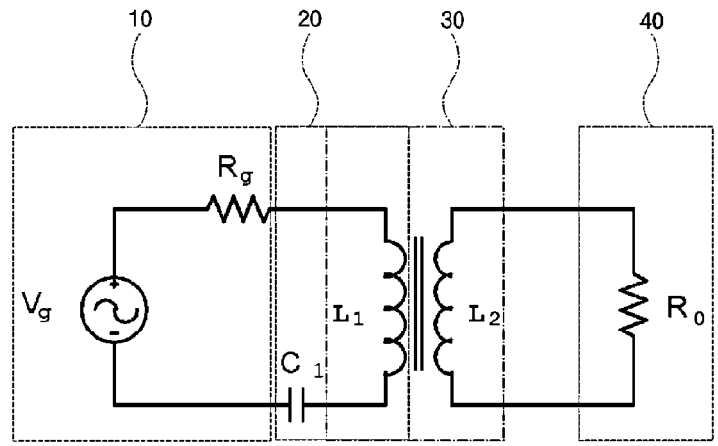
[Fig. 3]
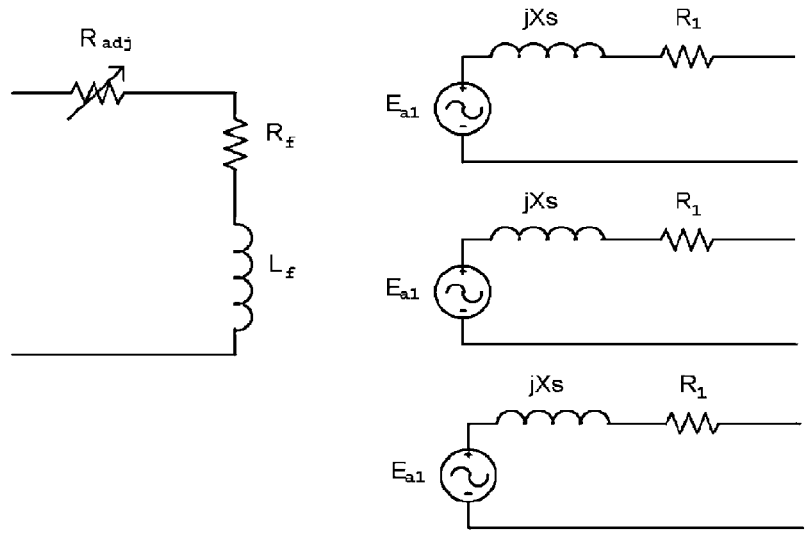
[Fig. 4]
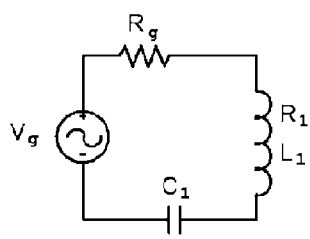
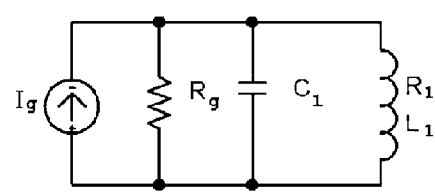
(a)          (b)

[Fig. 5]
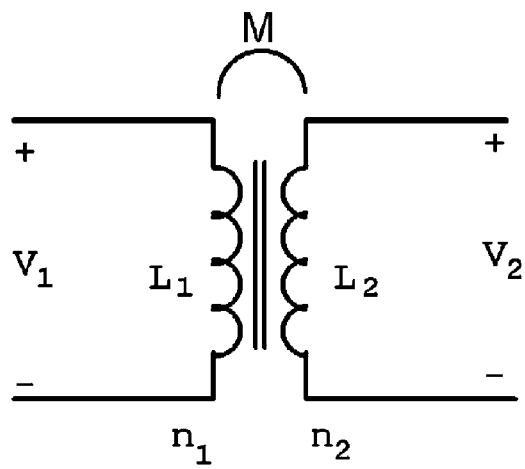
[Fig. 6]
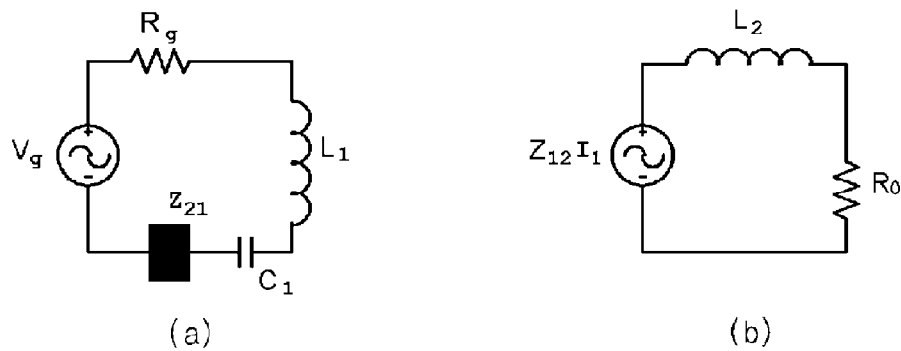
(a)    (b)
[Fig. 7]
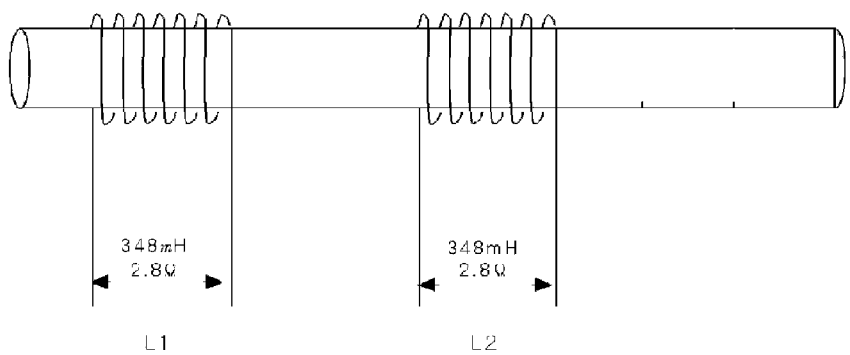
[Fig. 8]
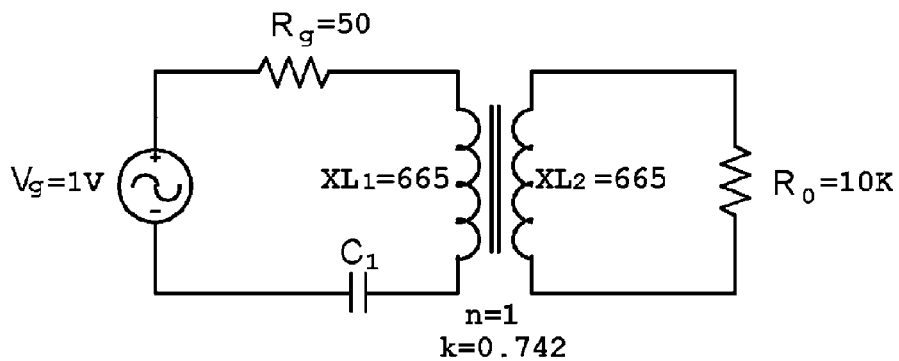

[Fig. 9]
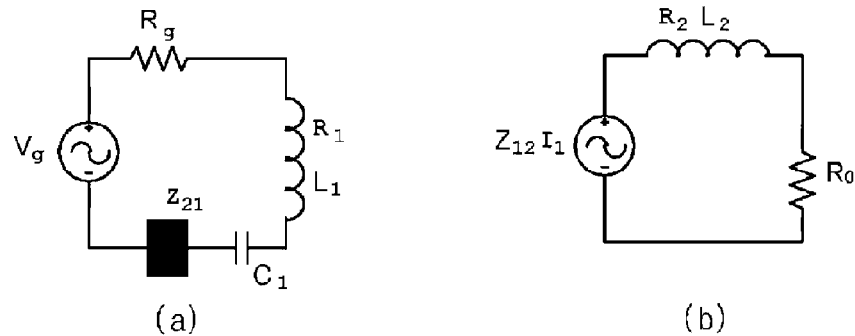
(a)　　　　　　　　　　　　(b)
[Fig. 10]
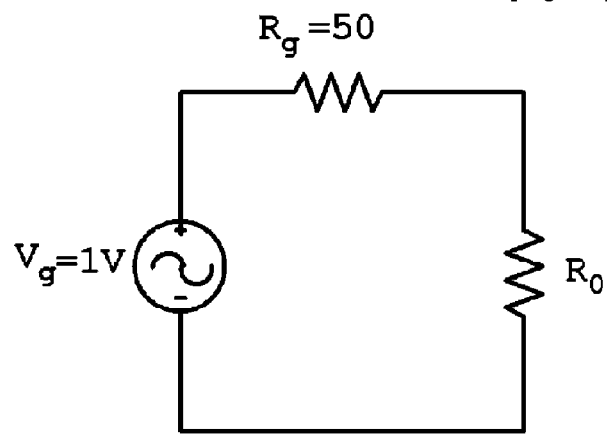
[Fig. 11]
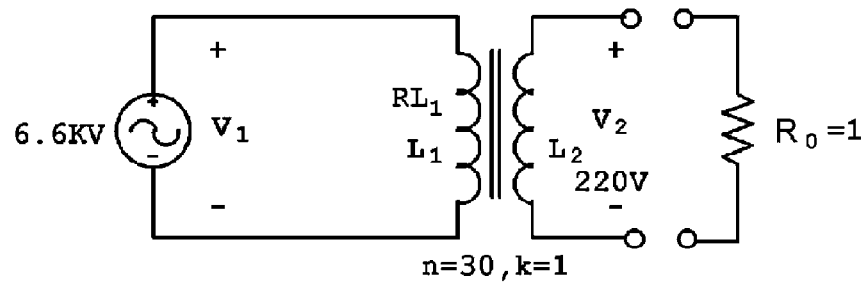
[Fig. 12]
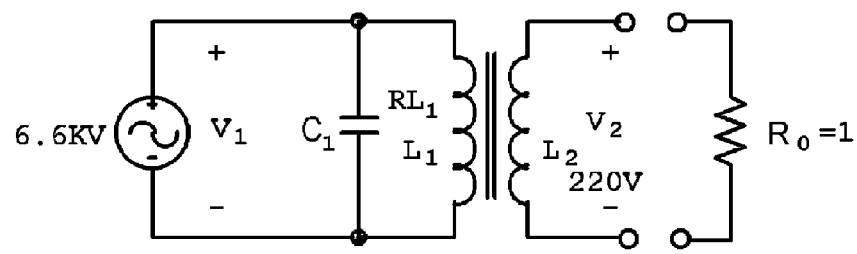
[Fig. 13]
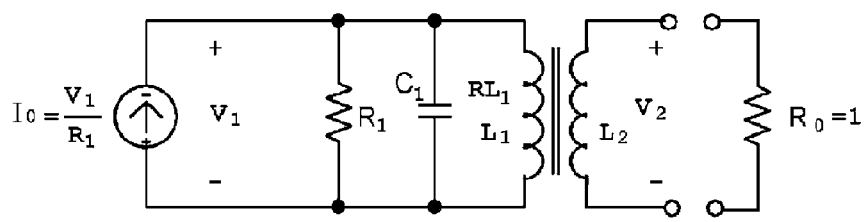

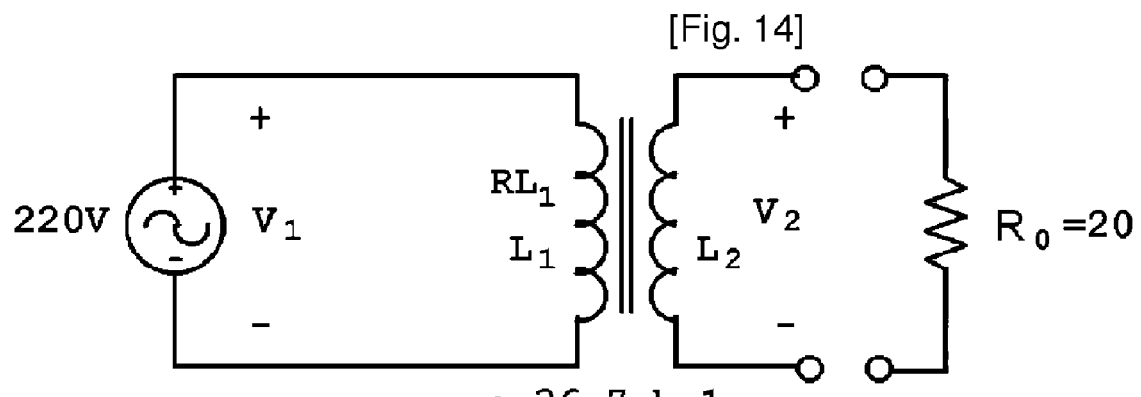
[Fig. 14]
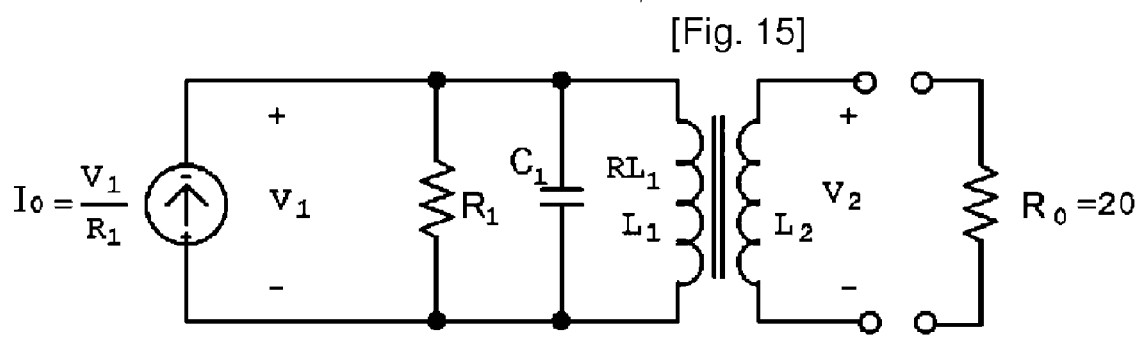
[Fig. 15]

CIRCUIT FOR TRANSMITTING AN AMPLIFIED RESONANT POWER TO LOAD

TECHNICAL FIELD

The present invention relates to a power amplifier circuit and its power transferring. More particularly, this invention relates to a circuit that can transfer amplified resonant power, which is generated by an inductor of a conventional transformer when serial or parallel resonance of a conventional power supply is formed, to a load through the conventional transformer.

BACKGROUND ART

An electric-power supply produces electric-power and supplies the produced electric-power to a load directly connected thereto. An example of such an electric-power supply is an electric generator. When such an electric generator produces electric-power, a transformer transforms the electric-power into a voltage or current compliant with a load's resistance and supplies it to the load.

According to a conventional electric-power supply method, an independent power supply used a primary power supply directly supplies electric-power to a load. That is, the consumption power of the load is directly provided by the independent power supply.

As such, the conventional electric-power supply method has only used an independent power supply that directly supplies power to a load. That is, a method where electric-power provided from an independent power supply is amplified and then supplied to a load has not been known.

Therefore, before supplying electric-power from an independent power supply to a load, if it is amplified and then supplied to the load, the electric-power consumption can be reduced. That is, such idea becomes a landmark in the industry.

DISCLOSURE OF INVENTION

Technical Problem

Therefore, the present invention has been made in view of the above problems, and it is an object of the present invention to provide a circuit for transferring amplified resonant power to a load that is capable of transferring Q times amplified resonant power, which is generated at an inductor of a conventional transformer when serial or parallel resonance of a conventional power supply is formed, to a load through the conventional transformer, thereby proving a higher amount of power to the load than a conventional circuit can, including the conventional power supply apparatus having simple functions.

Technical Solution

In accordance with an aspect of the present invention, the above and other objects can be accomplished by the provision of a circuit for transferring amplified resonant power to a load, comprising: a power supply for producing and supplying voltage or current; a power amplifier for generating amplified resonant power using the voltage or current; and a power transferring unit for transferring the amplified resonant power to the load using a transformer.

Preferably, the power supply is one of AC voltage source, AC current source, DC voltage source, and DC current source.

Preferably, the power amplifier includes: a primary inductor of the transformer; and a capacitor connected to the primary inductor in serial or in parallel. Here, the amplified resonant power is stored in the primary inductor.

Preferably, reflective impedance at the primary side of the transformer has a relatively small value such that the power amplifier can maintain resonance.

BRIEF DESCRIPTION OF THE DRAWINGS

The above and other object, feature and other advantages of the present invention will be more clearly understood from the following detailed description taken in conjunction with the accompanying drawings, in which:

FIG. 1 is a schematic circuit block diagram according to an embodiment of the present invention;

FIG. 2 is a view illustrating a circuit that transfers amplified resonant power, generated in serial resonance, to a load, according to an embodiment of the present invention;

FIG. 3 shows equivalent circuit diagrams of a three-phase synchronous electric generator according to an embodiment of the present invention;

FIG. 4A and FIG. 4B are equivalent circuit diagrams of serial and parallel resonance circuits, respectively, according to an embodiment of the present invention;

FIG. 5 is an equivalent circuit diagram of a transformer according to an embodiment of the present invention;

FIGS. 6A and 6B are equivalent circuit diagrams when a transformer connected to a load is in serial resonance, according to an embodiment of the present invention;

FIG. 7 is an exemplary view illustrating a transformer used in an embodiment of the present invention;

FIG. 8 is an equivalent circuit diagram of an electric-power amplification/transfer experiment circuit, according to an embodiment of the present invention;

FIG. 9 shows equivalent circuit diagrams of a circuit used in an experiment according to the present invention;

FIG. 10 is a circuit diagram where a load is directly connected to a power supply according to an experiment of the present invention;

FIG. 11 is an equivalent circuit diagram of a final transformer for electric-power transfer according to an experiment of the present invention FIG. 12 is an equivalent circuit diagram of an electric-power transfer resonant voltage source according to an experiment of the present invention;

FIG. 13 is an equivalent circuit diagram of an electric-power transfer resonant current source according to an experiment of the present invention;

FIG. 14 is an equivalent circuit diagram of an electric-power transfer transformer of a home electrical appliance, according to an experiment of the present invention; and FIG. 15 is an equivalent circuit diagram of an electric-power transfer resonant current source of a home electrical appliance, for reducing consumption power of a load, according to an experiment of the present invention.

BEST MODE FOR CARRYING OUT THE INVENTION

Preferred embodiments of a circuit for transferring amplified resonant power, configured to include the above-described means, and their operations, will be described in detail with reference to the accompanying drawings.

As shown in FIG. 1, the circuit according to the present invention is configured to include: a power supply 10 for producing and supplying electric-power a power amplifier 20 for resonating the electric-power provided from the power supply 10 to generate amplified resonant power, and storing it therein; and a power transferring unit 30 for transferring the amplified resonant power of the power amplifier 20 to a load 40.

The power supply 10 means a general independent power source. Such a general independent power source is used in such a way that its output voltage is increased or decreased to a voltage necessary for a load by a transformer, etc., and then transferred to the load. However, in the present invention, the power supply 10 just functions as only an accessory circuit that supplies current or voltage to the power amplifier 20 such that the power amplifier 20 can amplify power based on the current or voltage. The power supply 10 does not directly produce or provide its electric-power to the load.

The independent power supply source functioning as the power supply 10 may be implemented with an AC source and a DC source. The AC source includes an AC voltage source and an AC current source. The DC source includes a DC voltage source and a DC current source. When the independent power supply source is implemented with a DC source, the output of the DC source can be converted to AC power through an inverter.

The power amplifier 20 produces amplified resonant power using voltage and current outputted from the power supply 10. In an embodiment of the present invention, the amplified resonant power is transferred to a load through a transformer. More specifically, the power amplifier 20 produces the amplified resonant power using the primary inductor of the transformer, and is then stored in the primary inductor.

Here, the power amplifier 20 is configured to include the primary inductor of the transformer and a capacitor connected to the primary inductor in serial or in parallel. Here, the power amplifier 20 resonates and amplifies the power provided from the power supply 10 and then stores it in the inductor.

The power amplifier 20 affixes an inductor (L) and capacitor (C), which are electrical parts for storing energy, to the power supply 10, and enables the inductor (L) and capacitor (C) to be synchronous to the frequency of the source power and to form serial or parallel resonance. Therefore, the source power is amplified Q times and then stored in the inductor (L) and the capacitor (C).

When serial resonance is formed at a source voltage of $V_g$, Q times source voltage, i.e., $Q*V_g[V]$, is applied to the inductor. Here, the serial resonant power P by resonant current $I_0$ flowing in the inductor is generated such as $P_s = Q V_g * I_0[W]$.

On the other hand, when parallel resonance is formed, Q times input current of $I_g$, i.e., $Q*I_g[A]$, flows into the inductor.

Here, parallel resonant power $P_p$ by a voltage $V_p$ between both leads of the inductor generates as $P_p = Q I_g * V_p[W]$.

As such, in using serial or parallel resonance, the inductor for resonance stores Q times input power P therein. Here, the type of resonances can be chosen according to the object of the circuit design. And here, power generated in the inductor is reactive power, and, for convenience, denoted by power P.

The amplified resonant power, generated by the power amplifier 20, is transferred to the load 40 by the power transferring unit 30 composed of a commonly used transformer.

The power transferring unit 30 transfers the power, amplified Q times by the transformer in the power amplifier 20, to the load. In order to transfer power maximally, it is preferable that the coupling coefficient k be close to 1.

When serial resonance is formed, voltage $V_2$ at the secondary side of the transformer, which is hereinafter referred to as secondary voltage $V_2$, can be calculated by the following equation, based on the transformer principle. Here, the current $I_2$ at the secondary side, which is hereinafter referred to as secondary current $I_2$, is assumed to be 0.

$$V_2 = k*V_1/n = k*Q*V_g/n = (Q/n)*k*V_g$$

Where, Q denotes a quality factor of the circuit n denotes the turns ratio of the trans former k denotes the coupling coefficient $V_g$ denotes the source voltage and $V_1$ denotes a voltage between both leads of the inductor in serial resonance.

When the transformer is operated, the secondary current $I_2$ flows in the secondary side of the transformer. Then, reflective impedance $Z_{21}$ is reflected from the secondary side to the primary side, thereby suppressing resonance at the primary side.

Therefore, the reflective impedance at the primary side, which is hereinafter referred to as primary reflective impedance, is designed to be relatively small to maintain resonance in the power amplifier 20. In the present invention, an equation for voltage transfer to the secondary side and an equation for adjusting reflective impedance $Z_{21}$, when resonance is formed, are derived and then applied to the circuit design. Therefore, the present invention allows the amplified resonant power to be transferred to the load without loss, based on the transformer principle.

The load 40 is a circuit that is provided with the power amplified Q times at the primary inductor of the transformer. When the secondary current $I_2$ is not zero, resonance of the primary side of the transformer is broken by the reflective impedance of the transformer. To prevent this, the reflective impedance $Z_{21}$ must be adjusted and resistance $R_0$ of the load must be optimally chosen to maintain the resonance of the primary side.

An embodiment of the circuit for transferring amplified resonant power to the load, as configured above, according to the present invention, is illustrated in FIG. 2. As shown in FIG. 2, the circuit includes: a power supply 10 having an AC voltage source ($V_g$) and an internal resister ($R_g$) a power amplifier 20 having a primary inductor ($L_1$) of a transformer and a capacitor ($C_1$) serially connected to the inductor ($L_1$) a power transferring unit 30 having the transformer and a load ($R_0$) inputting resonant power, amplified by the power transferring unit 30.

FIG. 3 shows equivalent circuit diagrams of a three-phase synchronous electric generator according to an embodiment of the present invention. In such a circuit, $jX_s$ denotes reactance of an electric generator and $R_1$ denotes resistance of the inductor. The present invention transfers electric-power to the load where, in order to apply an equivalent circuit for a single phase electric power generation to a circuit, a capacitor is added to the circuit power is amplified by using resonance; and the amplified resonant power is directly provided to the load using the transformer principle. Therefore, the present invention transfers the amplified power to the load. On the other hand, the conventional power supply is directly connected to the load and transfers its power thereto.

FIG. 4A and FIG. 4B are diagrams illustrating a single phase equivalent circuit of an electric generator to which serial or parallel resonance is applied to amplify electric-power. Such a circuit is configured to include a power supply 10 and a power amplifier 20.

As shown in FIG. 4A, in the circuit to which serial resonance is applied, if resistance $R_1$ of a coil is neglected, the quality factor $Q_s$ is expressed as $Q_s = \omega L_1/R_g$, where $R_g$ denotes internal resistance of the power supply, and $R_1$ denotes loss resistance of the coil. Here, the factor $Q_s$ of a circuit is generally greater than 10. Also, a voltage $V_1$ between both leads of an inductor ($L_1$) in serial resonance is expressed as $V_1 = Q_s * V_g$. Here, power $P_1$ stored in the inductor ($L_1$) is expressed as follows:

$$P_1 = V_1 * I_0 = Q_s * V_g * I_0 = Q_s * V_{g2}/R_g$$

where, $I_0 = V_g/R_g$ ($I_0$: resonance current)

As well, the source power $P_g$ in serial resonance is expressed as $P_g = V_g * I_0 = V_{g2}/R_g$. Therefore, $P_1 = Q_s * P_g$. The equation shows that the inductor ($L_1$) in serial resonance inputs $Q_s$ times input power.

As shown in FIG. 4B, in the circuit to which parallel resonance is applied, like the serial resonant circuit, Q times power is applied to both leads of the inductor. Since such power amplification in the parallel resonant circuit is similar to that of the serial resonant circuit, which has already been described above, its description will be omitted.

FIG. 5 is an equivalent circuit diagram of a transformer used in the power transferring unit 30 according to an embodiment of the present invention.

When the transformer of the power transferring unit 30 is assumed to be ideal, input power $P_1$ of the primary side can be transferred to the secondary side without loss. Therefore, the power $P_2$ at the secondary side becomes the input power $P_1$, i.e., $P_1 = P_2$. However, when considering the coupling coefficient k and turns ratio n, the secondary side can be expressed as follows. Here, coil resistance is neglected.

$$V_2 = k * V_1/n$$

$$I_2 = k * n * I_1$$

$$P_2 = V_2 * I_2 = k^2 * P_1$$

On the other hand, when internal resistance $R_g$ of the power supply exists and the secondary current $I_2$ is not zero as a load having resistance $R_0$ is connected to the secondary side, reflective impedance $Z_{21}$ is coupled to the primary side. Here, the reflective impedance $Z_{21}$ can be expresses as $Z_{21} = -(sM)^2/Z_{22} = R_{21} + jX_{21} [\Omega]$.

FIGS. 6A and 6B are equivalent circuit diagrams of the primary and secondary sides of a transformer, respectively, when the resonant power amplified by the serial resonant circuit of FIG. 4A is transferred to the secondary side of the transformer, based on the transformer principle, as shown in FIG. 5.

As shown in FIG. 6B, in the equivalent circuit diagram of the secondary side of the transformer, $I_1$ denotes primary current and $Z_{12}$ denotes mutual inductance.

As shown in FIG. 6A, when the power supply circuit at the primary side is configured to be a serial resonant circuit and a load is connected to the secondary side circuit, reflective impedance $Z_{21}$ appears at the resonant circuit at the primary side. When the circuit is designed such that the reflective impedance $Z_{21}$ hardly affects the resonant circuit at the primary side, the resonant circuit continues its resonance. Then, the power amplified by such resonance is transferred to the secondary side, based on the transformer principle, such that the amplified power can be provided to the load.

The following is a detailed description of exemplary experiments to prove the above-described embodiments according to the present invention.

FIG. 7 is a view illustrating a transformer used in a practical experiment for an embodiment of the present invention. The transformer is designed in such a way that coils are wound around a ferrite core to form primary and secondary sides whose inductances are each 348 [mH] and whose turns ratio is n:1. As well, the transformer is operated in serial resonance. Here, DC resistance of the coil is 2.8 [$\Omega$] and coupling coefficient k is 0.742.

As well, for the experiment of the transformer of FIG. 7, a signal generator, Tektronix CFG 280 whose internal impedance is 50 [$\Omega$], is used as an AC power source and a serial resonance frequency of 304 [KHz] is used. An oscilloscope, Tektronix TDS 220, is used as a voltmeter.

FIG. 8 is an equivalent circuit diagram of an electric-power amplification/transfer experimental circuit according to an embodiment of the present invention. FIGS. 9A and 9B are equivalent circuit diagrams of the primary and secondary sides in the equivalent circuit of FIG. 8.

In the equivalent circuit at the primary side shown in FIG. 9A, equivalent resistance $R_T$ can be expressed as $R_T = R_g + R_1 + R_{21}$. Here, when a load ($R_0$) is connected to the circuit, the quality factor $Q_s$ can be expressed as $Q_s = XL_1/R_T$. Thus, the smaller the reflective impedance $R_{21}$, the better the power amplification.

Therefore, if the reflective impedance $Z_{21}$ is minimized at the primary side to maintain resonance when the circuit is designed, the amplified resonant power is transferred to the secondary side without loss, based on the transformer principle, such that the voltage and current corresponding to the transferred power can appear at the secondary side. Accordingly, the voltage at the primary side, amplified by serial resonance, becomes $Q_s * V_g$, and the voltage $V_2$ at the secondary side is expressed as $V_2 = (Q_s/n) * k * V_g$. When the coupling coefficient k is 1 and the turns ratio n is 1, the secondary voltage $V_2$ is amplified as Q times the source power $V_g$ and then applied to the load connected to the secondary side.

Since the secondary current $I_2$ is $k * n * I_1$, when n=1 and k=1, then $I_2 = I_1$. Here, $I_1$ is resonant current of the primary side and transferred to the secondary side without loss.

Therefore, the power $P_2$ transferred to the secondary side is expressed as the following equation.

$$P_2 = V_2 * I_2 = (Q_s/n) * k * V_g * k * n * I_1 = Q_s * k^2 * V_g * I_1 = Q_s * k^2 * P_1$$

The above equation, $P_2$, means that $Q_s$ times input power is transferred to the secondary side when resonance is formed with k=1. The load does not input electric-power from the power supply but inputs the resonant power amplified by the power amplifier, which is regarded as a main power supply. Thus, the power supply functions as a trigger (an auxiliary circuit) allowing such a resonance to be maintained.

In the experimental circuits shown in FIGS. 9A and 9B, when the load resistance $R_0$ is assumed to be 170 [kΩ], the reflective impedance $Z_{21}$ is expressed as follows:

$$Z_{21} = -(sM)^2/Z_{22} = 1.43 - j5.6*(10)^{-3} [\Omega] = R_{21} + jX_{21} [\Omega]$$

Here, assuming that Rg=50 [Ω], $R_0$=170 [kΩ], $XL_1$=665 [Ω], $XL_2$=665 [Ω], k=0.742, and n=1.

As described in the equation, since the reflective resistance $R_{21}$, 1.43 [Ω], is relatively smaller than the internal resistance Rg, 50 [Ω], it hardly affects the factor of circuit Qs. As well, since the reflective capacitive reactance $X_{21}$, 5.6* $(10)^{-3}$ [Ω], is relatively smaller than the inductive reactance, 665 [Ω], at the primary side, such a resonance can be constantly maintained.

The following Table 1 shows experimental measurement data of available power provided to a load ($R_0$) using a resonant circuit of the power supply whose internal resistance Rg is 50 [Ω] and whose voltage is 1 [V]. Here, the data is obtained when the coupling coefficient k is 0.742. However, when the coupling coefficient k is 1, then, $V_2=V_1$ and the power provided to the load is as described in Table 1. Here, $XL_2$ is neglected, because $R_0 >> XL_2$ when the power provided to the load is calculated.

As well, when $I_2$=0, the quality factor $Q_2$ at the primary side is expressed as $Q_s = XL_1/(R_g + R_1) = 665 [\Omega]/52.8 [\Omega]=12.59$, provided that $R_g$ denotes internal resistance of the power supply, 50 [Ω], and $R_1$ is DC resistance of the primary coil, 2.8 [Ω].

Since the case where load resistance $R_0$ is 1 [MΩ] is similar to that where $I_2$=0, $Q_s$ must be 12.59 like the theoretical value but, as described in Table 1, the experimental value is measured as 8.97. Such a result is estimated because the value of the factor $Q_s$ is reduced by resistance caused by the high frequency of the coil as well as the DC resistance of the coil.

Therefore, based on such a result, effective resistance $R_{eff}$ of the primary circuit can be calculated as $R_{eff} = XL_1/Q_s = 667 [\Omega]/8.97 = 74.1 [\Omega]$. Thus, the experiment circuit is estimated as being operated in a state where the effective resistance $R_{eff}$ is $R_{eff}$=74.1 [Ω] and the internal resistance $R_g$ of the power source is 50 [Ω]. The Table 1 shows that the quality factor $Q_s$ according to change of load resistance $R_0$ is $XL_1/(R_{eff} + R_{21})$, i.e., $Q_s = XL_1/(R_{eff} + R_{21})$.

The Table 1 shows that, when the load resistance $R_0$ is 1.2 [kΩ], the reflective resistance $R_{21}$ is 202.89 [Ω] and voltage amplification is approximately 2.4. Therefore, a circuit designed to have such conditions is operated in such a way that, when the load resistance $R_0$ is increased, the reflective resistance $R_{21}$ and the reflective impedance $Z_{21}$ are decreased but the quality factor $Q_s$ is increased.

The following Table 2 describes value calculated by an equation when the coupling coefficient k set to 1 at the resonant equivalent circuit of FIG. 8.

TABLE 1

Experimental measurement data of power, according to load change, in the equivalent circuit of FIG. 8

| Load Resistance, $R_0[\Omega]$ | Quality factor, $Q_S$ | Primary Voltage, $V_1$ [V] | Secondary Voltage, $V_2$ = 0.742 $V_1$ [V] | Available load power, $P_0 = V_2^2/R_0$ [μW] | Reflective Resistance, $R_{21}$ [Ω] |
|---|---|---|---|---|---|
| 1M | 8.97 | 8.97 | 6.65 | 42.9 | 0.24 |
| 170K | 8.80 | 8.80 | 6.55 | 252.3 | 1.43 |
| 10K | 6.56 | 6.56 | 4.92 | 2420.6 | 24.34 |
| 1.2K | 2.40 | 2.40 | 1.72 | 2465.3 | 202.89 |
| 870 | 1.93 | 1.93 | 1.34 | 2063.9 | 279.85 |

Where, $V_g$=1 [V], k=0.742, and n=1.

In Table 1, since the source voltage $V_g$ is 1 Volt, the value of the quality factor of the circuit $Q_s$ is equal to the magnitude of the voltage $V_1$ applied to the inductor ($L_1$). Therefore, the voltage $V_2$, transferred to the secondary side, is $k*V_1$.

TABLE 2

Theoretical values, at k = 1, in the equivalent circuit of FIG. 8

| Load resistance, $R_0[\Omega]$ | Quality factor, $Q_s$ | Primary Voltage, $V_1$ [V] | Secondary Voltage, $V_2$ = 0.742 $V_1$[V] | Available power of Load, $P_0 = V_2^2/R_0$ [μW] | Reflective Resistance, $R_{21}$ [Ω] |
|---|---|---|---|---|---|
| 1M | 8.93 | 8.93 | 8.93 | 79.7 | 0.44 |
| 170K | 8.67 | 8.67 | 8.80 | 442 | 2.6 |
| 10K | 5.62 | 5.62 | 5.62 | 3158 | 44.21 |
| 1.2K | 1.50 | 0.83 | 0.83 | 577 | 368.51 |
| 870 | 1.14 | 0.75 | 0.75 | 651 | 508.30 |

Where, $V_g$=1[V], k=1, and n=1.

In Table 2, since the reflective resistance $R_{21}$ is changed according to a change in the load resistance $R_0$ at k=1, when each $R_0$ in Tables 1 and 2 is 1.2 [kΩ] or 870 [Ω], the available power provided to the load ($R_0$) is decreased more than that in the case of k=0.742. Such a result is because parameters used for the reflective impedance $Z_{21}$, such as, coupling coefficient k, load resistance $R_0$, turns ratio n, and reactance $XL_1$, are associated with the design of a circuit for resonant power transfer.

The following Table 3 shows comparisons of magnitude of available power provided to a load ($R_0$) when the load ($R_0$) is directly connected to the source voltage with that of available power provided to a load ($R_0$) when the load is connected to an experimental circuit for power amplification with 1 [V] voltage source, as shown in FIG. 8.

FIG. 10 is a circuit diagram where a power supply is directly connected to a load to supply its power to the load. Here, since $R_0 \gg R_g$, the internal resistance $R_g$ of the power supply is neglected.

TABLE 3

Comparison of available load power between direct connection manner and source power amplification connection manner

| Load resistance, $R_0[Ω]$ | ①Direct connection manner $P_0 = V_g^2/R_0$ [μW] | Source power amplification connection manner $P_0 = V_g^2/R_0$ [μW] ② k = 0.742 | ③ k = 1 | Ratio of available load power, ②/power, ① | Ratio of available load ③/ ① |
|---|---|---|---|---|---|
| 1M | 1.0 | 42.9 | 79.7 | 42.9 | 79.7 |
| 170K | 5.9 | 252.3 | 442 | 42.76 | 74.91 |
| 10K | 100.0 | 2420.6 | 3158 | 24.20 | 31.58 |
| 1.2K | 833.3 | 2465.3 | 577 | 2.95 | 0.69 |
| 870 | 1149.4 | 2063.9 | 651 | 1.79 | 0.56 |

As described in Table 1, in the circuit where $Q_s$ is maintained at 6.56 in serial resonance, the available power provided to the load having load resistance $R_0$ of 10 [k], as described in Table 3, is 24.2 times power in the case of k=0.742 and 31.58 times power in the case of k=1 than that of the case where the load is directly connected to the power supply. This means that the load is provided with amplified power, $Q_s^2$ times greater than that of the conventional power providing method.

The following is a detailed description of a circuit for amplifying and supplying source power using parallel resonance, based on the experiment results.

Home electric-power is provided in such a way that 6.6 [kV] is transmitted to a transformer nearest a home and the transformer steps-down the voltage to a single phase 220 [V] to supply it to the home, so that home appliances can consume it.

FIG. 11 is an equivalent circuit diagram for transferring electric-power to loads in a home. The circuit is designed in such a way that load resistance $R_0$ is 1 [Ω] and a factor $Q_p$ of a desired circuit is 8.58. Here, the internal resistance of the power supply is neglected.

Here, the primary voltage of the transformer is 6.6 [kV] and the secondary voltage is 220 [V]. In addition, when the coupling coefficient k of the transformer is assumed to be 1, the turns ratio n is 30 ($=V_1/V_2=6.6$ [kV]/220 [V]). As well, the resistance of a load at home is assumed to be 1 [Ω].

Here, in order to apply 220 [V] to the load, the reactance at the secondary side of transformer shown in FIG. 11 must be chosen in such a way to be 1% of the load resistance, i.e., 0.0105 [Ω]. Since the reactance $X_1$ at the primary side and the reactance $X_2$ at the secondary side are each proportional to the square of the turns ratio, $XL_1=n^2\ XL_2=30^2\ (0.0105)=9.44$ [Ω]. Here, since the reflective impedance $Z_{21}$ is $-(sM)^2/Z_{22}=0.1-j0.01$ [Ω], it hardly affects the circuit at the primary side.

Therefore, a parallel resonance circuit of the primary side, for amplifying power, is applied to the power amplification circuit using parallel resonance, as shown in FIG. 12, thereby transferring the amplified resonant power to the secondary side.

Here, when the resistance $RL_1$ of the coil at the primary side is assumed to be 1 [Ω], the factor of circuit $Q_p$ is 8.58 ($=XL_1/R_{eff}=9.44$[Ω]/1.1 [Ω]), provided that $R_{eff}=RL_1+R_{21}$. As well, the resistance $R_1$ in the parallel resonance is 81 [Ω] ($=R_{eff}Q^2=1.1$ [Ω]*$(8.58)^2$). Here, the internal resistance of the power supply is neglected.

FIG. 13 is an equivalent circuit diagram of a current source, which is modified from the circuit of FIG. 12 as the voltage source is replaced with the current source.

As shown in FIG. 13, the resonant current $I_0$ is 0.0815 [kA] ($=V_1/R_1=6.6$ [kV]/81 [Ω]). The primary reactance $X_1$ allows a circulating current of 0.699 [kA], which corresponds to $I_0$ (0.0815 [kA]) times $Q_p$, to be flown therein. 6.6 [kV] is applied to both leads of the primary reactance. Therefore, under these conditions, the parallel resonant power $P_{1R}$ is 4,6134 [kW] ($=V_1*Q_p*I_0=6.6$ [kV]*0.699 [kA]).

However, in the equivalent circuit of FIG. 11, when the coil resistance $RL_1$ is neglected, the current I1 flown in the primary reactance $XL_1$ is 0.699 [kA] ($=V_1/XL_1=6.6$ [kV]/9.44 [Ω]. Therefore, the power $P_1$ applied to the primary reactance $XL_1$ is 4.6134 [kW] ($=V_1*I_1=6.6$ [kV]*0.699 [kA]).

Therefore, the parallel resonant power $P_{1R}$ of 4,6134 [kW] in parallel resonance is identical, in magnitude, to the power $P_1$ of 4,6134 [kW], not in resonance, and transferred to the load through the transformer. From view of the power supply, it must produce power $P_1$ of 4,6134 [kW], not in resonance. However, since the source power $P_g$ in parallel resonance, as shown in the equivalent circuit of FIG. 13, is 0.54 [kW] ($=V_1*I_0=6.6$ [kV]*0.0815[A]), the power supply in resonance may produce $P_1$ times $1/Q_s$. Therefore, from view of the electric generator, its output power seems to be increased. On the other hand, such an effect can be identically obtained from a circuit in serial resonance.

The present invention can save more of a load's consumption power than the conventional method can.

The following describes theoretical proposals for how the present invention can be applied to home appliances to save consumption power, based on the experiment results.

A general home appliance steps down from 220 [V] to a certain voltage using a transformer and then converts the step-down voltage to AC or DC to provide it to loads, for example, when an apparatus has regular output of 6 V and output current of 0.3 A.

Here, equivalent resistance $R_0$ of the load is 20 [Ω] (=$V_2$/$I_2$=6 [V]/0.3 [A]). In order to apply 99% of the voltage to the load ($R_0$), $XL_2$ is chosen to be 0.2 [Ω]. Here, the turns ratio n is 36.7 (=$V_1$/$V_2$=220 [V]/6 [V]), and the primary reactance $XL_1$ is 269 [Ω] (=$n^2$*$XL_2$=$36.7^2$*0.2 [Ω]).

Also, when the reflective impedance $Z_{21}$ and the resistance $RL_1$ of the primary coil ($L_1$) are chosen so that $Z_{21}$=−$(sM)^2$/$Z_{22}$=2.7−j0.027 [Ω] and $RL_1$=40 [Ω], the reflective impedance $Z_{21}$ hardly affects the primary circuit. Such an equivalent circuit of the transformer is illustrated in FIG. 14, in which the internal resistance of the power supply is neglected.

In FIG. 14, in order to apply 6 [V] to the load ($R_0$) of 20 [Ω], the primary current $I_1$ needs approximately 818 [mA] (i.e., $I_1$=$V_1$/$XL_1$=220 [V]/269 [Ω]≈818 [mA]), assuming that the primary coil resistance $RL_1$ is neglected.

Therefore, the power actually consumed by the load ($R_0$) is determined by the primary voltage, 220 [V], and the current, 818 [mA], of the primary side of the transformer shown in FIG. 14.

FIG. 15 shows an equivalent circuit diagram modified from the circuit of FIG. 14 as the voltage source is replaced with a current source. The circuit of FIG. 15 is configured to be operated in parallel resonance.

In FIG. 15, the internal resistance of the power supply is neglected. In the equivalent circuit using parallel resonance, the factor $Q_p$ is obtained as $Q_p$=$XL_1$/($RL_1$+$R_{21}$) =269 [Ω]/(40+27) [Ω]≈6.3. As well, the primary circuit resistance $R_1$ is obtained as $R_1$=($RL_1$+$R_{21}$)*$Q_p^2$=42.7*6.3≈1694.7 [Ω].

Therefore, the primary current $I_1$ is identical to the resonant current $I_0$, and obtained as $I_0$=$V_1$/$R_1$=220[V]/1694.7 [Ω]≈129.8 [mA]. Thus, the current $I_Q$, flown in the primary reactance $XL_1$, is obtained as $I_Q$=$Q_p$*$I_0$=6.3*129.8 [mA]≈818 [mA].

Therefore, under the condition that the coupling coefficient k is 1 and the turns ratio n is 36.7, the voltage $V_2$ and current $I_2$, obtained as $V_2$=$V_1$/n=220 [V]/36.7≈6 [V], and $I_2$=n*$I_Q$=36.7*818 [mA]≈30 [A], respectively, are transferred to the load at the secondary side of the transformer. Thus, the load can be operated by the voltage $V_2$ and current $I_2$, used as the regular voltage and current of the load.

However, since the consumption power of the load is caused by the power induced at the primary side of the transformer, the load actually consumes power caused by voltage and current used at the primary side. Therefore, when the resonance shown in the equivalent circuit of FIG. 14 is not used, the primary current $I_1$ is approximately 818 [mA] and the current $I_0$, flown in the primary side in parallel resonance shown in FIG. 15, is approximately 129.8 [mA]. Since the circuit inputs the same 220 [V], it can reduce power, provided to the load in parallel resonance, smaller approximately 6.3 times than that, provided to the load not in resonance. That is, the circuit can reduce the consumption power in parallel resonance by $Q_p$ times, compared to not in resonance.

INDUSTRIAL APPLICABILITY

As described above, the circuit according to the present invention can transfer amplified power to a load, compared to the conventional circuit where the electric-power is simply transferred to the load using an electric generator and a transformer. To this end, the circuit of the present invention is configured in such a way that: resonance (serial or parallel resonance) is formed at the side of the power supply; and the transformer circuit, used for transferring power to the load, is designed such that its reflective impedance can be set within a value to maintain the resonance. Therefore, the amplified resonant power is transferred to the load. That is, the circuit according to the present invention does not transfer the power, produced by an electric generator as a main power source, to the load, but transfers the amplified resonant power to the load.

In the circuit according to the present invention, the power supply (an electric generator, etc.) is regarded as an auxiliary circuit to produce resonant power. Power to be substantially transferred to a load is amplified by a parallel or serial resonant circuit, thereby providing the amplified resonant power to the load, compared to the conventional circuit where power produced by an electric generator is directly provided to the load. Therefore, the circuit of the present invention can reduce the consumption power of the load, from view of a load.

The present invention is operated to transfer resonant power to a load through a transformer, and may be analyzed as serial or parallel resonant circuit. Therefore, the present invention can be usefully applied to industrial power applications while satisfying energy conservation laws.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A circuit for transferring amplified resonant power to a load, comprising:
   a power supply for producing and supplying voltage or current;
   a power amplifier for generating an amplified resonant power using the voltage or current; and
   a power transferring unit for transferring the amplified resonant power to the load using a transformer, wherein a reflective impedance is adjusted and a resistance of the load is selected to maintain a resonance of a primary side of the power transferring unit.

2. The circuit according to claim 1, wherein the power supply is one of AC voltage source, AC current source, DC voltage source, and DC current source.

3. The circuit according to claim 1, wherein the power amplifier includes:
   a primary inductor of the transformer; and
   a capacitor connected to the primary inductor in serial or in parallel, wherein the amplified resonant power is stored in the primary inductor.

4. The circuit according to claim 1, wherein reflective impedance at the primary side of the transformer has a relatively small value such that the power amplifier can maintain resonance, wherein reflective resistance ($R_{21}$) of the reflective impedance ($Z_{21}$) is less than equivalent inductive reactance ($XL_1$) of the primary side of the transformer transferring the resonant power, and reflective reactance ($X_{21}$) is less than 0.5 of the equivalent inductive reactance ($XL_1$) of the primary side of the transformer.

5. The circuit according to claim 1, wherein the circuit amplifies power by using parallel resonance, and transfers the amplified resonant power to the load, such that power consumption of the load can be reduced.

6. The circuit of claim 1, wherein the power transferring unit has a coupling coefficient substantially equal to 1.

7. The circuit of claim 1, wherein a voltage under serial resonance at a secondary side of the power transferring unit equals $$i\, k^*V_1/n = k^*Q^*V_g/n = (Q/n)^*k^*V_g \text{ where}$$

Q denotes a quality factor of the circuit, n denotes a turns ratio of the power transferring unit, k denotes a coupling coefficient, $V_g$ denotes a source voltage, and $V_1$ denotes a voltage across an inductor in serial resonance.

8. The circuit of claim 1, wherein a smaller reflective impedance increases the amplified resonant power.

9. The circuit of claim 1, wherein the power supply is configured as a trigger to maintain a resonance.

10. The circuit of claim 1, wherein an increase in a load resistance decreases a reflective resistance and a reflective impedance but increases a quality factor of an inductor of a primary side of the power transferring unit.

11. The circuit of claim 1, wherein a power consumed by the load is determined by a voltage of a primary side of the power transferring unit and a current of the primary side of the power transferring unit.

12. A circuit comprising:
    a power supply for supplying one of a voltage or a current wherein the power supply is configured as a trigger to maintain a resonance;
    a power amplifier connected to the power supply, the power amplifier configured to generate an amplified resonant power using the one of the voltage and the current, wherein the amplified resonant power is associated with the resonance; and
    a power transferring unit connected to the power amplifier, the power transferring unit configured to transfer the amplified resonant power to a load wherein the power transferring unit has a coupling coefficient substantially equal to 1 and an increase in a resistance of the load decreases a reflective resistance and a reflective impedance but increases a quality factor of an inductor of a primary side of the power transferring unit.

13. A circuit comprising:
    a power supply for supplying one of a voltage or a current;
    a power amplifier connected to the power supply, the power amplifier configured to generate an amplified resonant power using the one of the voltage and the current; and
    a power transferring unit connected to the power amplifier, the power transferring unit configured to transfer the amplified resonant power to a load wherein a voltage under serial resonance at a secondary side of the power transferring unit equals $$k^*\, V_1/n = k^*Q^*V_g/n = (Q/n)^*k^*V_g \text{ where}$$

Q denotes a quality factor of the circuit, n denotes a turns ratio of the power transferring unit, k denotes a coupling coefficient, $V_g$ denotes a source voltage, and $V_1$ denotes a voltage across an inductor in serial resonance.

* * * * *